United States Patent
Perez et al.

(10) Patent No.: US 8,334,984 B2
(45) Date of Patent: Dec. 18, 2012

(54) SINGLE WAFER FABRICATION PROCESS FOR WAVELENGTH DEPENDENT REFLECTANCE FOR LINEAR OPTICAL SERIALIZATION OF ACCELEROMETERS

(75) Inventors: Maximillian A. Perez, Irvine, CA (US); Andrei A. Shkel, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 608 days.

(21) Appl. No.: 12/545,700

(22) Filed: Aug. 21, 2009

(65) Prior Publication Data

US 2010/0046002 A1 Feb. 25, 2010

Related U.S. Application Data

(60) Provisional application No. 61/091,329, filed on Aug. 22, 2008.

(51) Int. Cl.
G01B 9/02 (2006.01)
(52) U.S. Cl. .................. 356/519; 73/514.26
(58) Field of Classification Search .......... 356/450–521; 73/514.26
See application file for complete search history.

(56) References Cited

U.S. PATENT DOCUMENTS

| | | | |
|---|---|---|---|
| 5,589,689 A * | 12/1996 | Koskinen | 250/339.01 |
| 6,550,330 B1 * | 4/2003 | Waters et al. | 73/514.26 |
| 6,763,718 B1 * | 7/2004 | Waters et al. | 73/514.26 |
| 2004/0008438 A1 * | 1/2004 | Sato | 359/890 |
| 2005/0068541 A1 * | 3/2005 | Gunning et al. | 356/519 |
| 2005/0099691 A1 * | 5/2005 | Hendrix et al. | 359/557 |
| 2005/0111008 A1 * | 5/2005 | Murata | 356/519 |
| 2007/0024857 A1 * | 2/2007 | Menezo | 356/478 |
| 2009/0122319 A1 * | 5/2009 | Ronnekleiv et al. | 356/477 |

* cited by examiner

Primary Examiner — Tarifur Chowdhury
Assistant Examiner — Michael P Lapage
(74) Attorney, Agent, or Firm — Daniel L. Dawes; Marcus C. Dawes

(57) ABSTRACT

A plurality of Fabry-Perot interferometric sensors are optically coupled in series with each other to form an ordered optical series. Each Fabry-Perot interferometric sensor has a unique signalband and a passband. Each Fabry-Perot interferometric sensor has its unique signalband within the passbands of all of the next higher ordered Fabry-Perot interferometric sensors in the optical series so that a corresponding unique fringe signal from each of the Fabry-Perot interferometric sensors is a multiplexed output from the optical series.

11 Claims, 15 Drawing Sheets

SINGLE WAFER FABRICATION PROCESS FOR WAVELENGTH DEPENDENT REFLECTANCE FOR LINEAR OPTICAL SERIALIZATION OF ACCELEROMETERS

RELATED APPLICATIONS

The present application is related to U.S. Provisional Patent Application Ser. No. 61/091,329, filed on Aug. 22, 2008, which is incorporated herein by reference and to which priority is claimed pursuant to 35 USC 119.

GOVERNMENT SUPPORT

This invention was made with Government support under Grant No. CMS0330470, awarded by the National Science Foundation. The Government has certain rights in this invention.

BACKGROUND OF THE INVENTION

1. Field of the Invention

The invention relates to the field of fabrication and implementation of a high resolution fiber optic based accelerometers.

2. Description of the Prior Art

In optics, a Fabry-Pérot interferometer or etalon is typically made of a transparent plate with two reflecting surfaces, or two parallel highly reflecting mirrors. (Technically the former is an etalon and the latter is an interferometer, but the terminology is often used inconsistently.) Its transmission spectrum as a function of wavelength exhibits peaks of large transmission corresponding to resonances of the etalon. The resonance effect of the Fabry-Pérot interferometer is identical to that used in a dichroic filter. That is, dichroic filters are very thin sequential arrays of Fabry-Pérot interferometers, and are therefore characterized and designed using the same mathematics. Etalons are widely used in telecommunications, lasers and spectroscopy to control and measure the wavelengths of light. Recent advances in fabrication technique allow the creation of very precise tunable Fabry-Pérot interferometers.

The prior art has disclosed the use of coherence division multiplexing of multiple Fabry-Perot Interferometers (FPI) based sensors in a parallel array. This scheme requires a high precision scanning reference interferometric cavity. Others have disclosed a system of six optical fiber FPI strain sensors with unique cavity path lengths which demonstrated coherence division multiplexing in series. The system required the use of a laser-referenced Michelson interferometer to resolve the signals Still others have showed a frequency domain multiplexing to resolve the signal from a serial system of three fiber FPI strain sensors. Extensive data post processing applied to data acquired from a monochromator was required to extract the sense signal. It is known to use coherence division multiplexing with three FPI temperature sensors. A temperature controlled scanning Mach-Zehnder interferometer reference is employed. It is also known to use wavelength division multiplexing of two FPI pressure and temperature sensors using finer Bragg grating or arrayed waveguide gratings.

There are no prior art systems of simply multiplexed FPI-based accelerometers in transmission. The similar systems reported in the literature above represent the present state of the art of similar sensor system technology. None of the previously proposed or developed systems use wavelength dependent reflectivity to achieve sensor multiplexing. The common characteristic of the previously developed multiplexing techniques for FPI based sensors is that these techniques require relatively complex infrastructure (optical splitters and couplers, fixed and variable optical references, gratings or waveguide systems, etc) and signal processing techniques. Sealing of these systems require multiplication of the infrastructure components. The simplicity of the system presented here is preferable for many applications.

Systems have been proposed using fiber Bragg gratings (FBG). However, since such sensors are formed in the bulk of an optical fiber, it is difficult to form sensor systems involving mobile elements (especially inertial sensors) using such systems.

BRIEF SUMMARY OF THE INVENTION

The illustrated embodiments include a method for the fabrication and implementation of a high resolution fiber optic based accelerometers. The creation of the optical elements in a single process contributes to the ease of manufacture. The illustrated embodiment includes a combination of elements comprising a system with low sensor signal loss and crosstalk. An extension of this system using an alternative thin film reflector technique is also uniquely disclosed. The methods disclosed are generally applicable to the field of fiber optic sensors.

The illustrated embodiment of the invention is an optical accelerometer based on Fabry-Perot Interferometers (FPI) used in transmission. It allows such sensors to be combined in a linear array. The technique allows the optical signals from each sensor to be automatically combined (multiplexed) at different wavelengths. This occurs in a way similar to the wavelength division multiplexing (WDM) technique used in optical communication systems. Using optical filters formed from multilayers of thin films deposited on the surface of the sensor, the optical properties of each sensor in the array are designed to be transparent and reflective at different light wavelengths. Light of the wavelengths of the reflective region is used by the sensor to create an optical signal in that region that change when the sensor experiences acceleration. Light in the transparent region is passed through the device for use by other devices in the series. By using the natural variation in the fabrication of the thin film filters, the reflection/transmission characteristics of each sensor are made to be of different wavelengths. This allows the sensors of the series to be formed from a single wafer.

No previous seismic accelerometers have been created with integrated optical signal wavelength multiplexing capabilities. The main advantages over similar sensors systems are that the present system is simpler and requires fewer optical components to achieve signal multiplexing.

The invention is proposed to be used for acceleration sensing at multiple points over a distributed area, including, but not limited to large: system or vehicle monitoring, structural health monitoring, tactical or border monitoring, etc.

More particularly, the apparatus of the illustrated embodiments comprises a plurality of Fabry-Perot interferometric sensors optically coupled in series with each other to form an ordered optical series, each Fabry-Perot interferometric sensor having a unique signalband and a passband, each Fabry-Perot interferometric sensor having its unique signalband within the passbands of all of the next higher ordered Fabry-Perot interferometric sensors in the optical series so that a corresponding unique fringe signal from each of the Fabry-Perot interferometric sensors is a multiplexed output from the optical series.

Each Fabry-Perot interferometric sensor is characterized by wavelength-dependent reflectance.

The plurality of Fabry-Perot interferometric sensors are optically coupled with each other to form a simply connected linear array along a beam of light, for example carried in a fiber optic.

In one embodiment each Fabry-Perot interferometric sensor comprises a thin film multilayer reflector. In another embodiment the thin film multilayer reflector comprises a quarter wave multilayer reflector. In still another embodiment the thin film multilayer reflector further comprises two quarter wave reflectors with an intervening half wave dielectric layer therebetween. In yet another embodiment each Fabry-Perot interferometric sensor comprises a Rugate thin film reflector.

In the illustrated embodiment the apparatus further comprises a corresponding plurality of accelerometers, each accelerometer having a reference plate and a proof mass plate resiliently coupled to the reference plate and movable with respect thereto, the reference plate and proof mass plate having optically treated surfaces to form an optical resonance cavity between each other forming a corresponding Fabry-Perot interferometric sensor, the optical resonance cavities of the plurality of accelerometers being serially optically coupled with each other to form the ordered optical series.

The illustrated embodiment of the apparatus further comprises a broadband light input optically coupled to a first one of the Fabry-Perot interferometric sensors of the ordered optical series and an optical detector optically coupled to the a last one of the Fabry-Perot interferometric sensors of the ordered optical series.

In one embodiment the apparatus comprises a corresponding plurality of seismic accelerometers, each seismic accelerometer having a reference plate and a proof mass plate resiliently coupled to the reference plate and movable with respect thereto, the reference plate and proof mass plate having optically treated surfaces to form an optical resonance cavity between each other forming a corresponding Fabry-Perot interferometric sensor, the optical resonance cavities of the plurality of accelerometers being serially optically coupled with each other to form an ordered optical series, each Fabry-Perot interferometric sensor having a unique signalband and a passband, each Fabry-Perot interferometric sensor having its unique signalband within the passbands of all of the next higher ordered Fabry-Perot interferometric sensors in the optical series so that a corresponding unique fringe signal from each of the Fabry-Perot interferometric sensors is a multiplexed output from the optical series.

The illustrated embodiments of the invention further include a method comprising the steps of: providing a double sided polished wafer; depositing a reflector on one side of the wafer and an anti-reflection coating on the opposing side of the wafer; selectively disposing a patterned photoresist layer on the reflector; attaching a handle wafer to the anti-reflection coating on the opposing side of the wafer; selectively etching through the reflector on one side of the wafer, the anti-reflection coating on the opposing side of the wafer and the wafer to the handle wafer to define a flexure mold; disposing a resilient polymer into the flexure mold to form elastomeric flexures; removing the handle wafer; providing a double sided polished reference plate with a reflector on one side of the reference plate and an anti-reflection coating on the opposing side of the reference plate; and disposing the reference plate onto and opposing the wafer separated by spacers aligned with respect to the wafer and having the corresponding reflectors on the wafer and reference plate facing each other to form a Fabry-Perot interferometric sensor.

In another embodiment the illustrated method comprises the steps of: providing a double sided polished wafer; depositing a reflector on one side of the wafer and an anti-reflection coating on the opposing side of the wafer; selectively disposing a patterned photoresist layer on the reflector; attaching a handle wafer to the anti-reflection coating on the opposing side of the wafer; selectively etching through the reflector on one side of the wafer, the anti-reflection coating on the opposing side of the wafer and partially through the wafer to define a flexure of thin material remaining from material of the wafer; removing the handle wafer; providing a double sided polished reference plate with a reflector on one side of the reference plate and an anti-reflection coating on the opposing side of the reference plate; and disposing the reference plate onto and opposing the wafer separated by spacers aligned with respect to the wafer and having the corresponding reflectors on the wafer and reference plate facing each other to form a Fabry-Perot interferometric sensor.

In either one of the embodiments the step of depositing a reflector on one side of the wafer comprises depositing a thin film multilayer reflector on one side of the wafer. In one embodiment the step of depositing a thin film multilayer reflector on one side of the wafer comprises depositing a thin film quarter wave multilayer reflector on one side of the wafer. In another embodiment the step of depositing a thin film quarter wave multilayer reflector on one side of the wafer comprises depositing two thin film quarter wave multilayer reflectors on one side of the wafer with a half wave dielectric layer therebetween. In another embodiment the step of depositing a reflector on one side of the wafer comprises depositing a Rugate reflector on one side of the wafer.

The scope of the invention further includes a method comprising fabricating a plurality of Fabry-Perot interferometric sensors using natural variation in fabrication of the thin film filters to make unique reflection/transmission characteristics of each Fabry-Perot interferometric sensor at different wavelengths so that a plurality of Fabry-Perot interferometric sensors of the series to be formed from a single wafer.

In one embodiment each of the Fabry-Perot interferometric sensors is a seismic accelerometer with integrated optical signal wavelength multiplexing capability.

The scope of the invention includes a method of using the plurality of Fabry-Perot interferometric sensors of claim 1 for acceleration sensing at multiple points over a distributed area, including, but not limited to large system or vehicle monitoring, structural health monitoring, tactical or border monitoring.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

BRIEF DESCRIPTION OF THE DRAWINGS

The patent or application file contains at least one drawing executed in color. Copies of this patent or patent application publication with a color drawing will be provided by the Office upon request and payment of the necessary fee.

Figure 1:
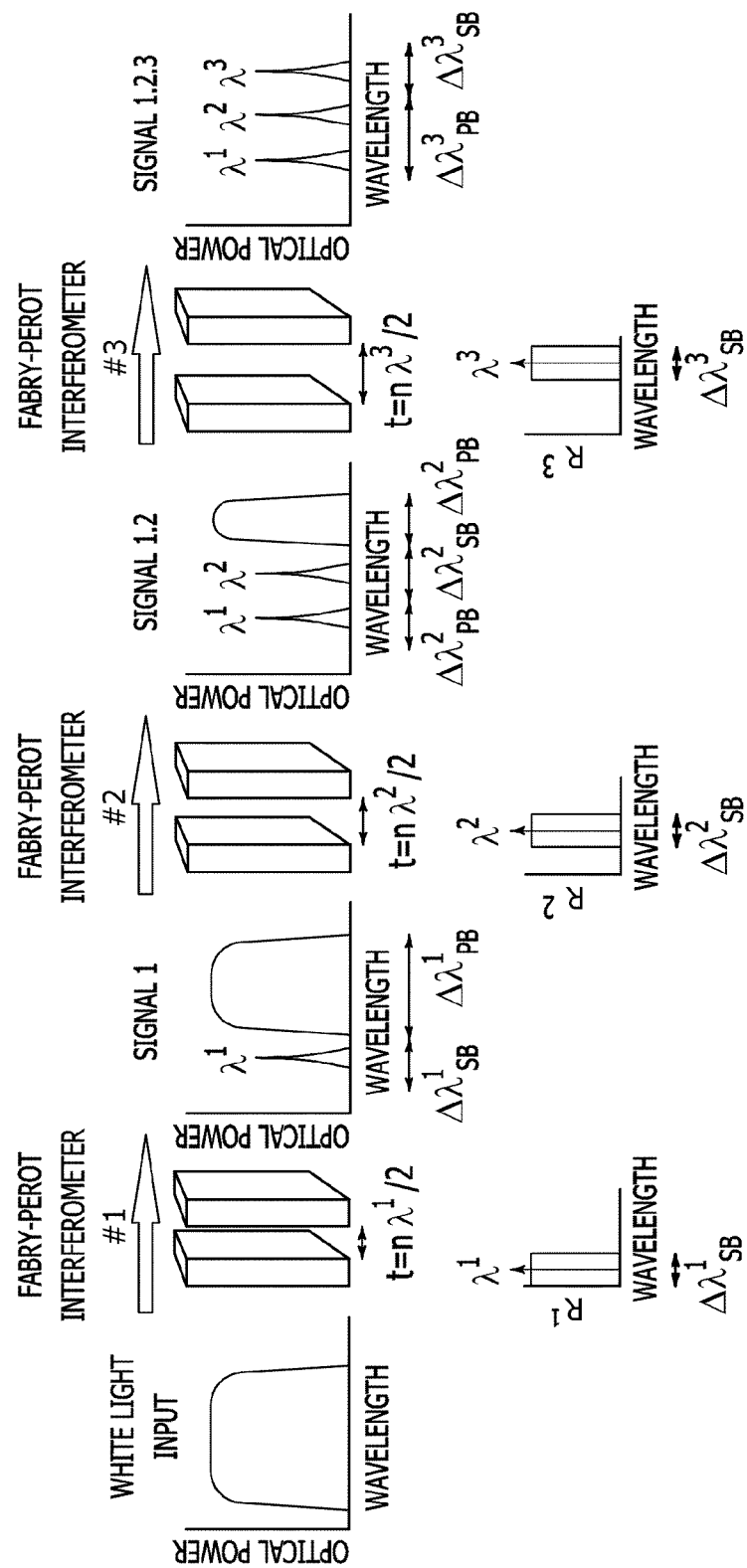
FIG. 1 is a schematic diagram depicting a serial system of three ideal Fabry-Perot interferometers with ideal wavelength dependent reflectance characteristics for wavelength-division sign multiplexing of interferometric fringe signals.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

The invention is a method for creating systems of optical sensors based on Fabry-Perot Interferometers (FPI) used in transmission. The sensors are combined in a serial (in-line) array along a single optical path such as with an optical fiber. This configuration allows the sensors to be connected into sensor networks and the optical signals from each sensor to be automatically combined (multiplexed) at different wavelengths. This occurs in a way similar to the Wavelength-Division-Multiplexing (WDM) networking techniques employed in optical communication systems. In general, the creation of such systems composed of FPI-based sensors is not possible without the techniques described here, since a conventional FPI-based sensor acts as a 'loss filter' blocking light wavelengths needed by downstream devices. Such a sensor system has not been previously reported.

Using optical reflectors formed from multilayers of thin films deposited on the surface of the sensor, the optical properties of each sensor in the array are designed to be transparent and reflective at different light wavelengths. Light of the wavelengths of the reflective region is used by the sensor to create an optical signal that changes when the sensor experiences a change in the measurand, e.g. acceleration. Light in the transparent region is transmitted through the device for use by other devices in the series. By using the natural, predictable variation in the fabrication process of the thin film multilayers, the reflection/transmission characteristics of each sensor are made to be of different wavelengths for each device. This allows the sensors of the series to be formed from a single process simplifying the creation of the system and reducing the cost.

In the illustrated embodiments, the serialization of FPI-based sensors is demonstrated by the formation and characterization of FPI-based passive, linear accelerometers. However, the technique of the wavelength multiplexing of FPI-based sensor signals through the use of wavelength dependent reflectance of FPI-based sensors is general to all sensors that can be implemented based on transmission-type Fabry-Perot Interferometers. These sensor types include pressure sensors, chemical sensors, rotational and linear inertial sensors, etc. The described technique can be used to allow the serialization of such sensors into extended sensor networks. In addition to the integrated multiplexing capabilities of the network, the advantageous properties of such a network include:

a. Unpowered—No local power is required at the sensor nodes. Power is only required at the launch (optical source) and collection (optical detector) points, which may be located at the same site. Each sensor node is passively, optically interrogated according to its physical and optical properties.

b. Scalable—Sensor nodes can be added or removed as needed with minimal change in the net-work and the network can be expanded or reduced to fit the need.

c. Distributable—Since the sensor signals are potentially transmitted by optical signals along fiber optic cable, the sensor nodes may be located far apart (up to hundreds of kilometers) without signal degradation.

d. Robust—The sensor network itself is 'all-optical' and contains no electrical components. As such the sensor signals are robust to electromagnetic interference.

Similar optical sensors systems exist in the form of the widely studied systems of fiber Bragg gratings (FBG). These systems have many of the same advantages. However, such systems do not have the versatility as system based on Fabry-Perot Interferometer disclosed here. The sensor elements of such FBG systems are integrated into the bulk of an optical fiber and are used principally as displacement sensors in the form of strain gages or as temperature sensors. They are not generally useful for the formation of sensitive inertial sensors as in the illustrated embodiments or other sensors based on small deformations under small loads, such as pressure or acoustic sensors.

Consider first some background information relating to the Fabry-Perot Interferometer. The Fabry-Perot Interferometer (FPI) is an elegant device that can be constructed of two parallel plates with reflective inner surfaces. When the gap between the plates is spaced on the order of a light wavelength, an optical resonance cavity is formed that defines a transmitted intensity peak, known as a interferometric fringe. All other light wavelengths are blocked. As such, such devices are frequently used as optical bandpass loss-filters. The sensitive dependence of the spectral (wavelength) placement of this fringe on the gap spacing between the plates makes such a device suitable for a variety of high-sensitivity sensor applications. However, the interferometric fringe formed from the resonance cavity is only created from light wavelengths at which the plates of the FPI are highly reflective. If the reflectance of the plates are engineered to be only strongly reflective over a limited range, then the it will only act as an optical resonance cavity over that range and can be made transparent or at least with negligible reflectivity to wavelengths outside that range. These transparent regions can be made to pass interferometric fringe signals from other similar devices in the series.

This effect is used in this work to create a system of two devices that demonstrate the FPI-based sensor serialization principle. The ideal (lossless) optical transmission response (T) of the parallel plate FPI is described by the Airy function, given for operation in air as $$\mathcal{T}(\lambda) = \left[1 + \frac{4\mathcal{R}_s(\lambda)}{(1-\mathcal{R}_s(\lambda))^2}\sin^2\left(\frac{2\pi t}{\lambda}\right)\right]^{-1}, \quad (1)$$

where $R_s(\lambda)$ is the reflectance of the inner surface of the plates, $\lambda$ is the light wavelength and t is the gap between the plates. Conventionally, devices are designed assuming that $R_s$ is constant over the wavelengths of intended use and $R_s \neq f(\lambda)$. In the illustrated embodiments, devices are specifically designed such that $R_s = f(\lambda)$. In the ideal case, $R_s$ is either high ($R_s \approx 1$) or low ($R_s \approx 0$). This forms either signal bands (SB) or a pass bands (PB) over the wavelengths $\Delta\lambda_{SB}$ and $\Delta\lambda_{PB}$, respectively.

In the low reflectance region, $R_s(\Delta\lambda_{PB}) \approx 0$ and the transmission T is constant ($T \approx 1$) for all wavelengths in the passband and the device is transparent to any signals of these wavelengths. In the high reflectance region, $R_s(\Delta\lambda_{SB})$ approaches 1 as closely as possible and the transmission is that of a conventional FPI, such that the interferometric fringe placement is dependent on the gap between the plates and is given by $$t = \frac{n\lambda}{2}, \quad (2)$$

where n is an integer (n=1; 2; 3 : : : ) known as the order of the FPI and specifically identifies each fringe, and wavelength $\lambda$ is the position of the interferometric fringe.

Turn now and consider the FPI-based Sensor. From equation (2) above, relative parallel displacement between FPI plates causes a shift in the wavelength position of the transmitted fringe and the relative shift between the plates ($\Delta t$) is given by $$\Delta t = \frac{n(\lambda - \lambda_i)}{2} = \frac{n\Delta\lambda}{2}, \quad (3)$$

where $\lambda_i$ is the wavelength of the fringe before the plate shift and $\lambda$ is the wavelength of the fringe after the shift. Monitoring the shift ($\Delta\lambda$) in the fringe wavelength is the basis of many sensors, including the ones developed in the illustrated embodiments.

Turn now and consider serialized FPI Sensors. For a linear series of FPI sensors defined in terms of their individual spectral (wavelength-dependent) transmittance (normalized transmission), (T($\lambda$)), the total spectral transmittance of the serial sensor network ($T_{series}(\lambda)$) is the simple product of the individual sensor transmittances such that $$T_{series}(\lambda) = T_1(\lambda) \times T_2(\lambda) \times T_3(\lambda) \quad (4)$$

where $T_{1; 2; 3} : : : (\lambda)$ are the transmission characteristics of each sensor (measured or estimated from equation (1) above) at each wavelength over the region at which the system is intended for use.

If the signal band of one sensor is placed at the wavelengths over which the passbands of the sensors in the rest of the series fall, then the interferometric fringe signal of the sensor will be transmitted through the series. If the sensor system is designed such that all the signal bands of the individual sensors falls on the passbands of all other sensors, each sensors signal with appear in the transmitted output of the system, as shown in FIG. 1. Each of these fringes are then available to carry sense information from each sensor in the series.

Consider now thin film multilayer reflectors. Highly reflective, low-loss surfaces are commonly created from multilayer stacks of thin film dielectric materials. These structures are composed of alternating layers of high and low index of refraction material. Reflections from the interfaces between each layer combine to form regions of high and low reflection at specific wavelengths. This property is used in the illustrated embodiments to form wavelength dependent reflectors.

For example, consider first quarter wave multilayer reflectors. If the thickness of each layer are all equal to one quarter optical path length of a specified wavelength, then the surface will have a high reflectance at that wavelength. The high reflectance region will extend over a wavelength range centered at the specified wavelength and then fall off, creating a wavelength-dependent 'notch' reflector. The formed reflectance properties approximate the ideal wavelength dependent characteristics required by the system. However, for the reflectance region to extend over a narrow enough band of wavelengths to multiplex a number of devices, the layer stack must be able to be formed from an large number of layers of alternating index of refractions with small differences. In addition, the thickness of each layer must be closely controlled in order to maintain wavelength dependent reflectance characteristics close to the ideal characteristics shown in FIG. 1.

Consider nest quarter, half and quarter wave multilayer filters. If two quarter wave reflectors are split by a dielectric layer of half-wave optical thickness, then the structure acts as a 'fixed' Fabry-Perot filter. In the illustrated embodiments, this layer is referred to as the critical layer. In such, the quarter wave structures act as reflectors forming an optical cavity in the half wave layer. This provides a narrow, low reflectance region within the extended high-reflectance region that can be used as a WDM passband. The wavelength position of the transmitted light is dependent on the thickness of the critical layer ($t_c$) as given by $$t_c = \frac{n\lambda_c}{2\mu}, \qquad (5)$$

where $\lambda_c$ is the wavelength of the passed light and $\mu$ is the index of refraction of the central, critical layer material.

In contrast to the single quarter wave multilayer structure, this structure is used here to form reflectors in which the wavelength dependence is tied to only one dielectric layer. The index difference between each layer of the quarter wave reflectors can be made large and high reflectance can be achieved with a low number of layers. Requirement on the thickness control of each layer is relaxed and the variation in the thickness of the half wave layer allows the wavelengths of the transmitted light (acting as a signal passbands) to be varied among devices fabricated from a single wafer. However, the reflectance characteristics are inverted from that of the Quarter Wave Multilayer filters such that serialization of only two devices is achievable. It is this effect that is employed in the proof of concept of the illustrated embodiments.

Turn now to consider rugate reflectors. Rugate thin film filters have the preferential characteristics of the previous two methods without many of the trade-offs. They have optical 'notch' reflector characteristics similar to quarter wave multilayer reflectors, but are created from a single thin film layer with a index of refraction that varies continuously through the film thickness. Such films are generally formed by varying the chemical composition of the film during deposition. They necessarily do not have large differences in index of refraction between the maximum and minimum value. Due to this, reflective bands over narrow bandwidths suitable for the creation of serializable FPI sensors are readily achieved. Additionally, the reflectors are formed from a single film layer and as such do not require strict thickness control over each of a number of discrete layers. Rugate films thus have ideal characteristics for the formation of wavelength dependent reflectors for serializable FPI reflectors and would allow the serialized sensor network embodiments to be generalized to a large number of nodes.

Figure 2:
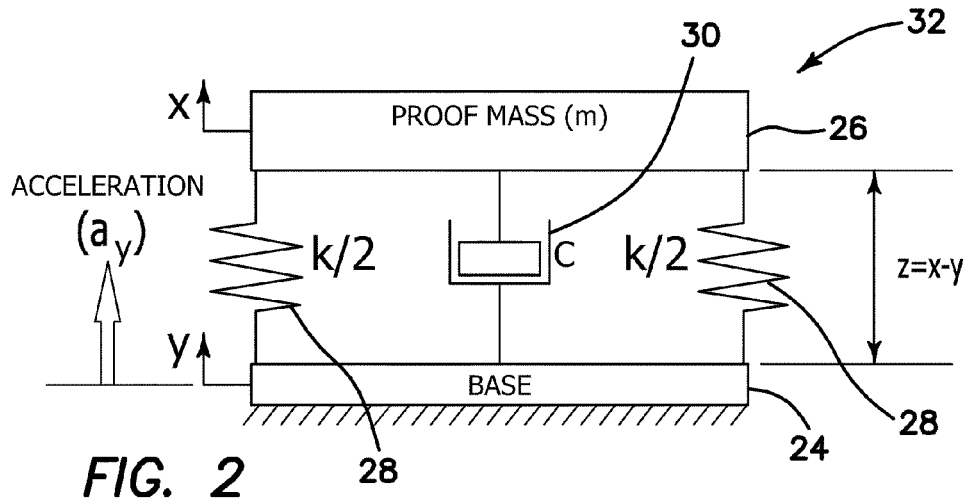
FIG. 2 is a diagram of a lumped parameter model of a passive accelerometer of proof mass (m) with suspension stiffness (k) and damping (c).

Turn now to the application of a passive accelerometer 32 diagrammatically shown in FIG. 2. A stationary base 24 is resiliently coupled to a proof mass 26 by means of one or more resilient flexures 28. Damping between base 24 and movable or oscillating proof mass 26 is denoted by damper 30. Although the multiplexing technique described here is general in application to all FPI-based sensors operating in transmission, here it is applied to the serialization of FPI-based passive accelerometer inertial sensors. The following is a short description of the operation of such instruments. The mechanical response of the passive accelerometer is modeled as a lumped mass-spring-damper system shown diagrammatically in FIG. 2 and is written in the Laplace domain as $$\frac{Z(s)}{s^2 Y(s)} = \frac{Z(s)}{a_y(s)} = \frac{-m}{ms^2 + cs + k}, \qquad (6)$$

where m is the mass of the sensing element (proof mass), c is the effective damping, k is the total stiffness and s is the Laplace variable, which can be expressed as a complex frequency $s=i\omega$. Y is the base displacement, X is the proof mass displacement, Z is relative displacement between the two, and $a_y$ is the acceleration applied to the sensor (FIG. 2). When normalized by mass, the parametric model is expressed as $$\frac{Z(s)}{A_y(s)} = \frac{-1}{s^2 + 2\omega_n \zeta s + \omega_n^2}, \qquad (7)$$

where the angular natural frequency $\omega_n = \sqrt{k/m}$ and the damping ratio $\zeta = c/(2m\omega_n)$. Commonly, such sensors are designed to operate at frequencies in the 'flat' (gain stable with respect to frequency) response region below their natural frequency, with the response derived from equation (7) above as $s \to 0$ as $$z = -(m/k)a_y = -\frac{1}{\omega_n^2}a_y \qquad (8)$$

Thus, the acceleration on the devices is proportional to the relative displacement between the proof-mass and the base reference. In usual operation, the base is fixed to the item or structure that is being monitored through the sensor enclosure.

Now turn to consider the FPI-Based Accelerometer. The spectral position of an interferometric fringe created by an optical cavity between two reflective surfaces provides a high-precision pick-off (sensing) mechanism for the spacing between the proof mass and the reference of a passive accelerometer 32 as diagrammatically shown in FIG. 3. Proof mass 26 has a reflector 12 formed on its lower surface. Reference plate 34 is aligned with respect to proof mass 26 and also has a reflector 12 on its upper surface opposing the reflector 12 on the lower surface of proof mass 26. The space between proof mass 26 and reference plate 34 forms an optical resonance cavity 36, whose width or size varies according to the relative motion of proof mass 26 with respect to reference plate 34. Proof mass 26 is suspended over reference plate 34 by means of resilient flexures 28 coupling proof mass 26 to a surrounding base or frame 24. Flexures 28 are arranged and configured to allow movement or oscillation of proof mass 26 vertically in the depiction of the plane of FIG. 3 relative to stationary reference plate 34. However, it is to be expressly understood that the geometry of accelerometer 32 can be altered according to conventional accelerometer design principles to allow and sense movement in other axial directions or rotations without departing from scope of the invention. Frame 24 and reference plate 34 are aligned with respect to each other and held apart by means of a plurality of beads 22. Combining the response of the FPI-sensor in equation (3) with the frequency linearized response of the passive accelerometer in equation (8) by setting t=z yields:

$$a = -\omega_n^2 \frac{n(\lambda - \lambda_i)}{2} = -\omega_n^2 \frac{n\Delta\lambda}{2}, \quad (9)$$

where $\lambda$ is the wavelength of the displaced fringe under acceleration a. The acceleration can be monitored by the modulation of the transmitted optical power, as with a laser, by $$a = -\omega_n^2 \frac{n}{2} \left[\frac{\delta\lambda}{\delta T}\right]_{\lambda_0} \frac{1}{P_{\lambda_0}} \Delta P, \quad (10)$$

where $[\delta T/\delta\lambda]_{\lambda_0}$, is the slope of the fringe, $P_{\lambda_0}$ is input optical power at the wavelength $\lambda_0$ and $\Delta P$ is the power modulation.

Figure 4:
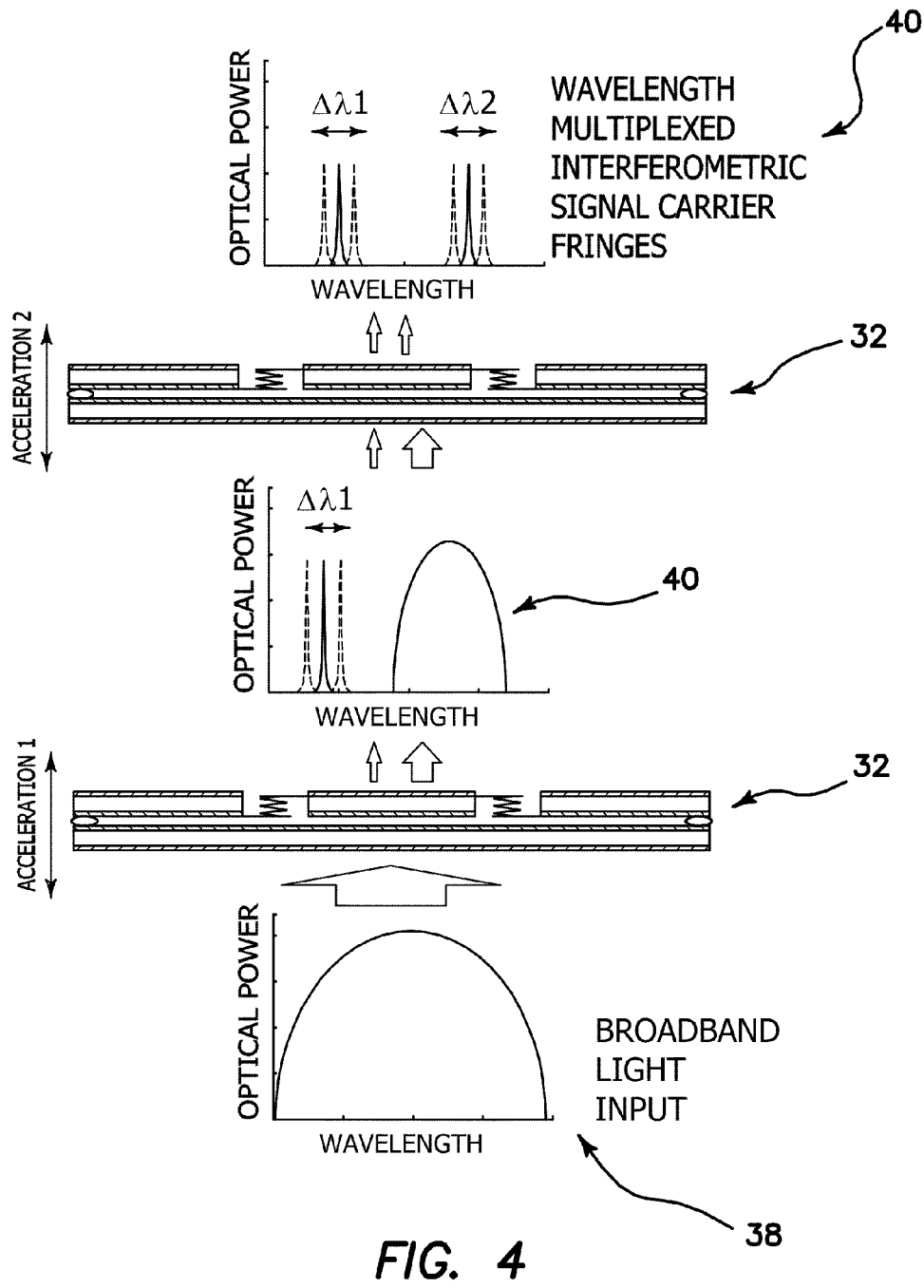
FIG. 4 is a five-part diagram depicting the optical operation and schematic cross-section of two Fabry-Perot based accelerometers with wavelength dependent reflectance characteristics. The lower portion shows a simplified graph of the optical power as a function of wavelength of a broadband light input. This light is input into accelerometer #1 above depicted above it. The middle portion is a simplified graph of the optical power as a function of wavelength of the light output of accelerometer #1, which is used an input into accelerometer #2 depicted above the graph. The upper portion is a simplified graph of the optical power as a function of wavelength of wavelength multiplexed interferometer signal carrier fringes output from accelerometer #2.

Thus, the acceleration on an FPI-based accelerometer 32 can be expressed as a change in the power of a laser 38, symbolically denoted in FIG. 4 by the light input graph, passed through the device at wavelength $\lambda_O$. If multiple devices are placed in a linear series and the interferometric fringes of each sensor are transmitted through the series (as is disclosed) each accelerometer or sensor 32 can be similarly and simultaneously monitored by optically interrogating the system at the wavelength of each sensors fringe by one or more detectors 40, symbolically denoted by the light output graphs in FIG. 4. In general, fringe shift pick-off (read-out) mechanisms similar to equation (10) can be developed for other FPI-based sensor types and an identical detection scheme can be developed.

The simplicity of the illustrated embodiments is preferable for many applications. Furthermore, the previous schemes have been only demonstrated for slowly varying (quasi-static) measurements and it is not understood how they will behave for the dynamic signals encountered under a wider range of sensor types, especially inertial. The requirement of fiber Bragg gratings or an arrayed waveguide to provide wavelength multiplexing increases the complexity of the system. In the illustrated embodiments, the multiplexing capability is integrated into the optical structure of each sensor.

Figure 5:
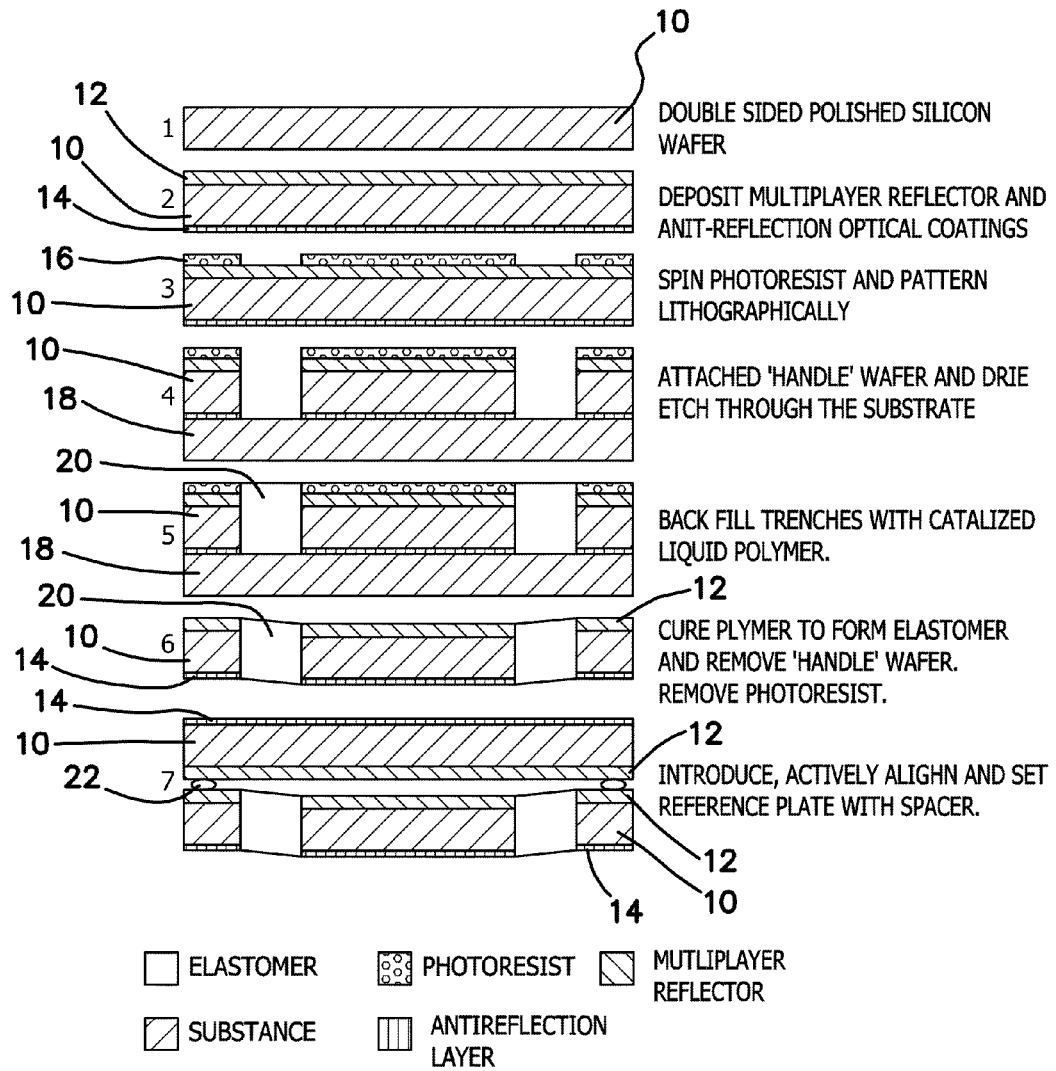
FIG. 5 is a side cross sectional view of a series of steps of an FPI-based accelerometer fabrication process with elastomeric suspension elements.
Figure 6:
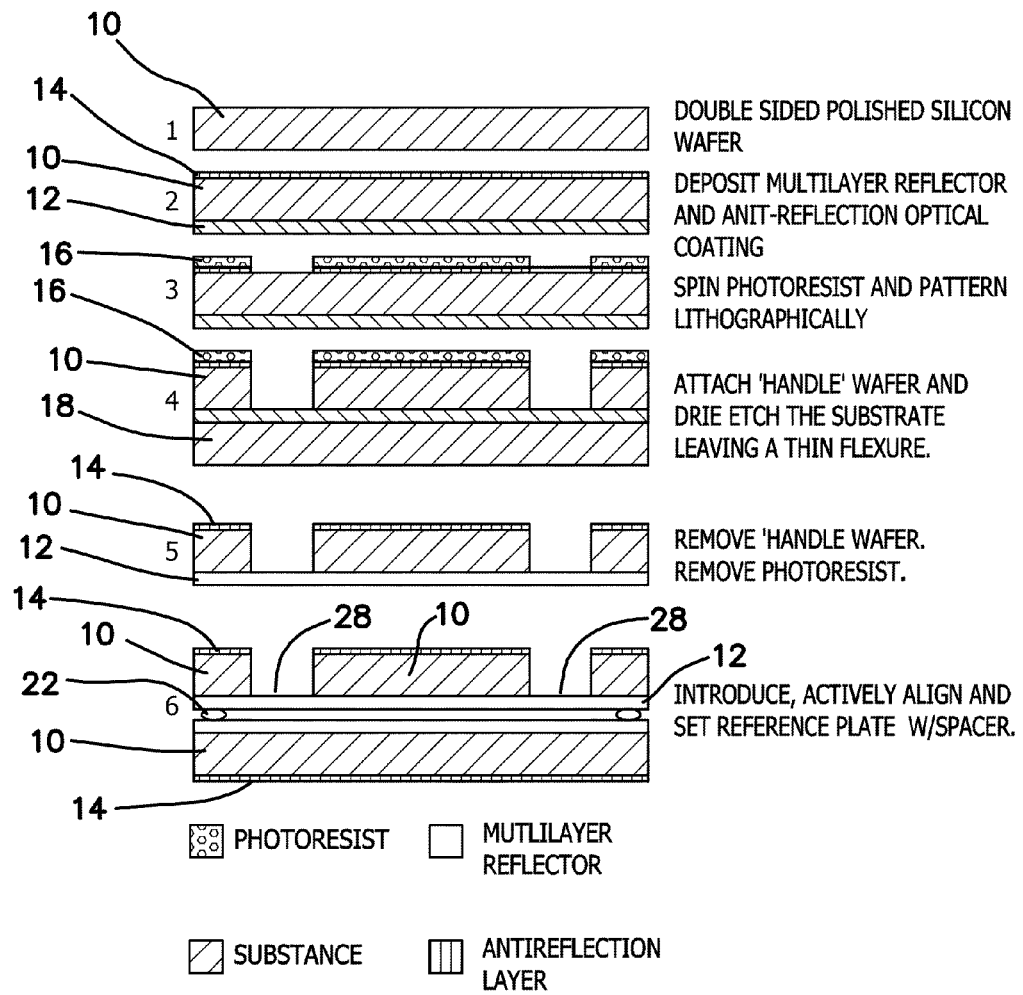
FIG. 6 is a side cross sectional view of a series of steps of an FPI-based accelerometer fabrication process with thinned-wafer suspension elements.

Consider now the fabrication process used in the illustrated embodiments. The fabrication processes of FIGS. 5 and 6 are used to achieve the structure shown schematically in FIG. 3: FIG. 5 illustrates the steps used for the fabrication of the bulk micromachined FPI sensors. The device is fabricated by first depositing on one side of a double sided polished (DSP) 500 µm thick wafer 10 at step 1 the multilayer interference filter 12. On the other side, a 200 nm thick anti-reflectance (AR) layer 14 of stoichiometric silicon nitride (SixNy) is deposited as shown at step 2. In the illustrated embodiment the optical layers on both sides are deposited by plasma enhanced chemical vapor deposition (PECVD) using a Plasma-Therm 790. A thick photoresist (AZ4620) layer 16 is spun on and is lithographically patterned at step 3. The partially completed wafer is attached to a handle wafer 18 via a water soluble adhesive (Crystalbond 555) and a deep-reactive-ion-etch (DRIE) system (STS MESC ICP Etcher) is used to through-etch the partially completed wafer from the AR surface of layer 14 to the QWDS surface as shown at step 4. The flexure suspension structures for the proof mass plate are formed while the device wafer is still attached to the handle wafer 18, by depositing catalyzed liquid polymer 20 (Dow Corning Sylgardflc 184) into the etched trench via a pulled micropipette using the through-etch channels as a mold as shown at step 5. This polymer is cured at room temperature overnight forming a solid, but compliment elastomer providing a well defined flexure for the proof mass. Reference plate structures are created similarly but without the elastic flexure. The devices are removed from handle wafer 18 by melting the adhesive and dissolving any residual adhesive in warm water as shown at step 6. The plates are assembled into FPI sensors by aligning the plates to each other while observing the transmitted interferometric fringe from a broadband source (HP 83438A) free space coupled to a optical spectrum analyzer (Agilent 86140B) and allowing epoxy beads 22 acting as spacers to set when the interferometric fringe is at maximum finesse as shown at step 7. This assembly process allows spectral position of the signal carrying fringe to be varied arbitrarily (within the limits of the process) allowing it to fall in a signal band that is wavelength aligned to the passbands of the other devices in the serial system.

Figure 3:
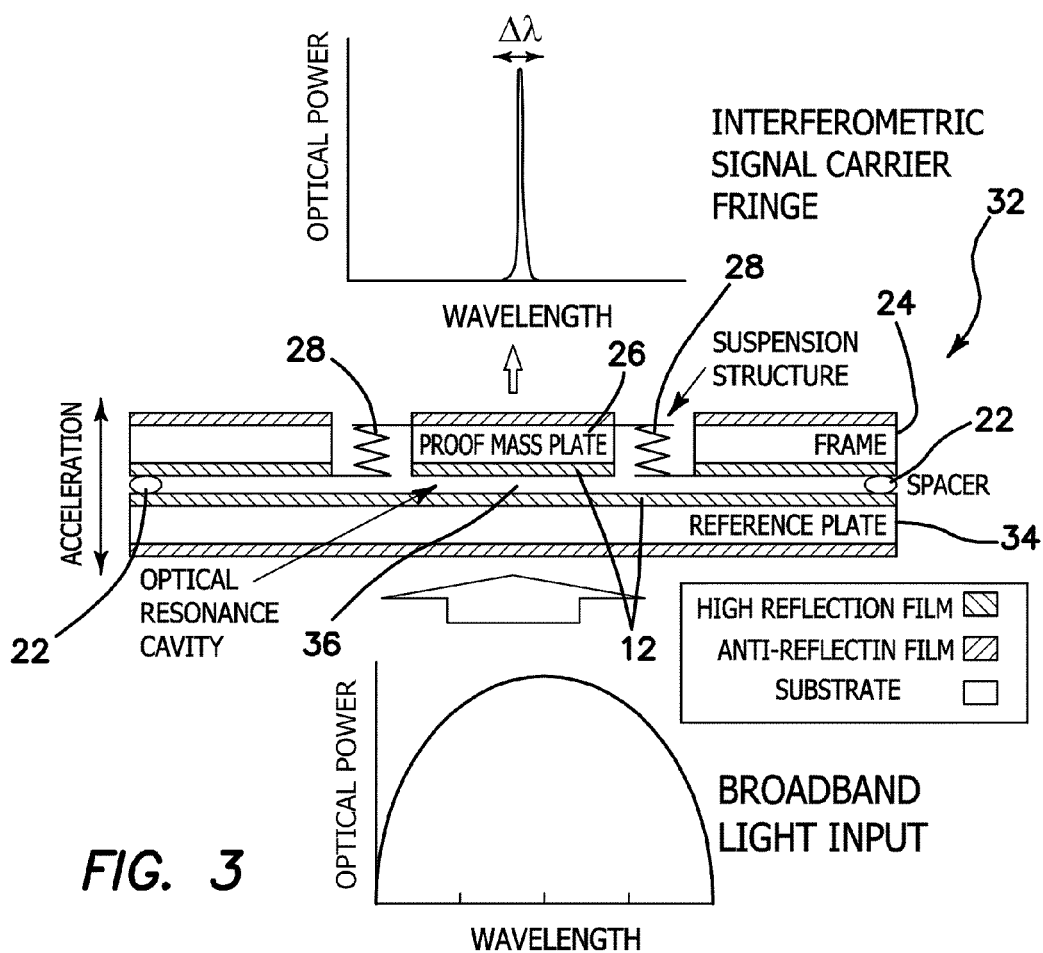
FIG. 3 is a three-part diagram of the optical operation and schematic cross-section of the Fabry-Perot based accelerometer of the illustrated embodiment. The top portion is a simplified graph showing the optical power as a function of wavelength for an interferometric signal carrier fringe. The middle portion is a side cross-sectional view of the Fabry-Perot based accelerometer. The lower portion is a simplified graph showing the optical power as a function of wavelength for a broadband input light signal.
Figure 7:
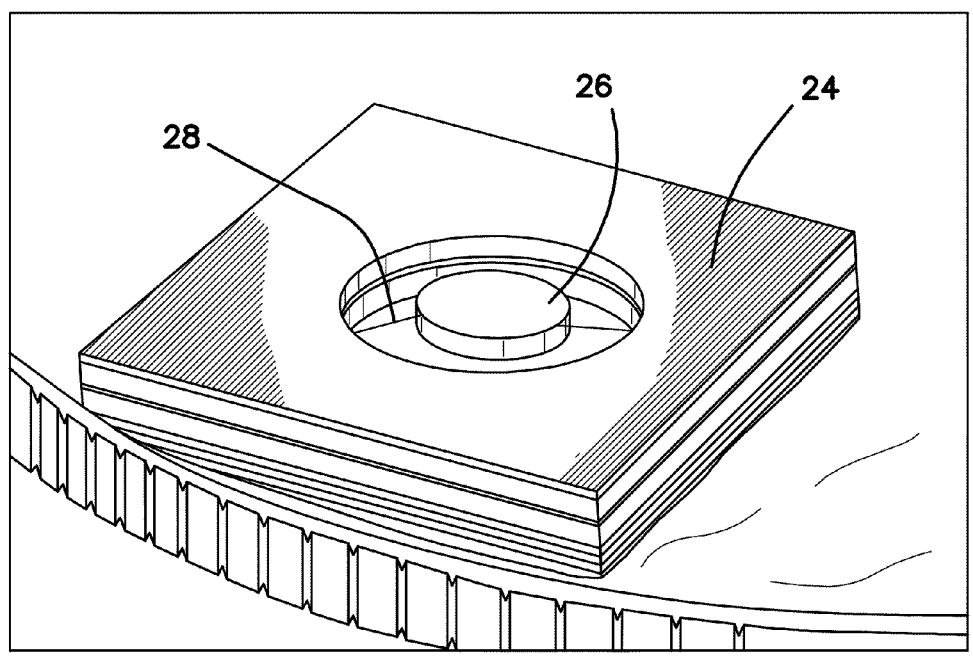
FIG. 7 is photograph of an assembled FPI-based accelerometer with thinned-wafer suspension elements made according to the method of FIG. 6.
Figure 8:
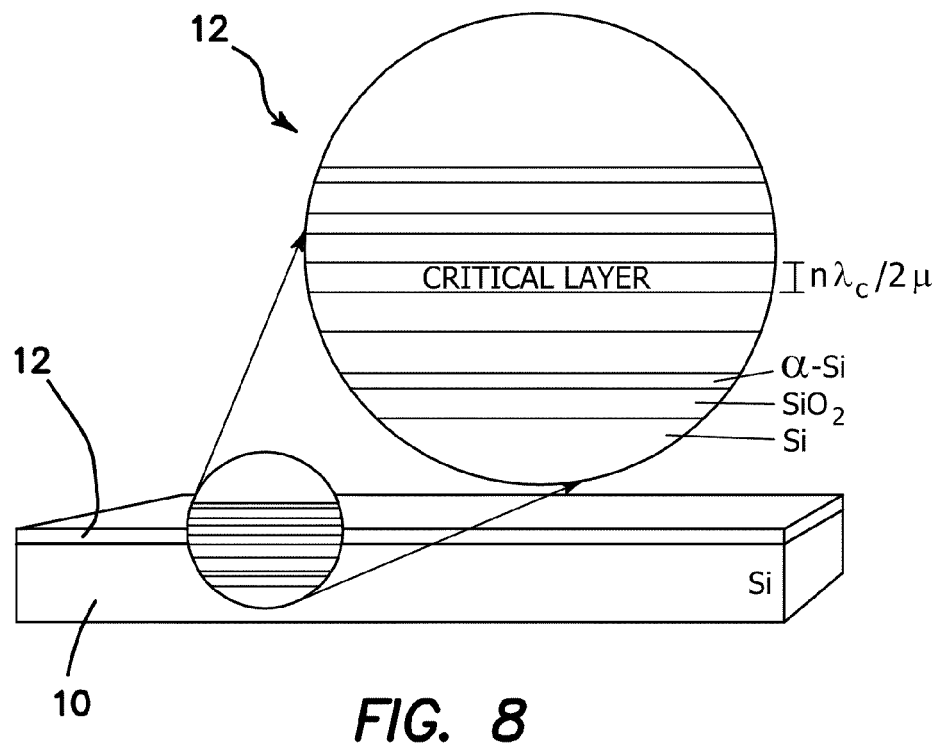
FIG. 8 is a schematic of multilayer half, quarter and half wave thin film multilayer filter on a silicon substrate.
Figure 9:
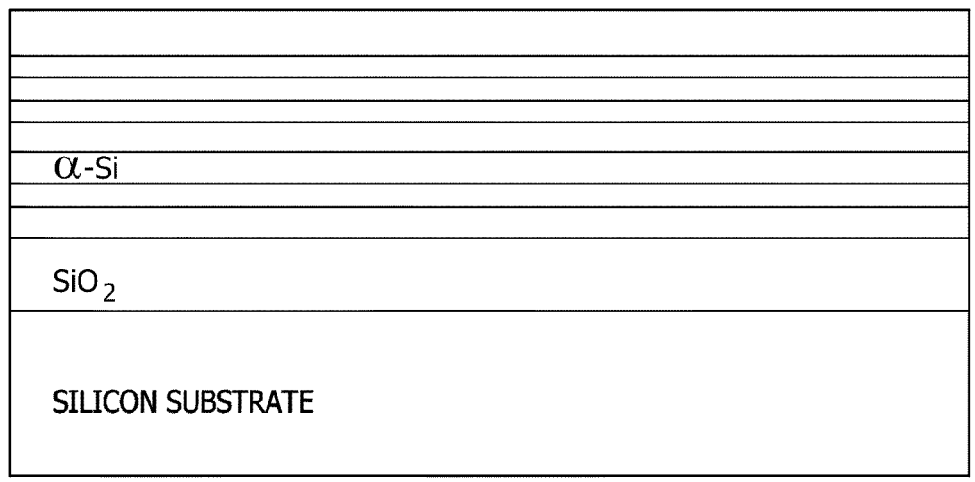
FIG. 9 is a photograph of a cross section of a realized multilayer half, quarter and half wave thin film multilayer filter on a silicon substrate.

An alternative process illustrated in FIG. 6 shows an alternative process used to achieve the structure of FIG. 3 with a less complicated process flow. Instead of a through-wafer etch, a thin membrane of the wafer 10 is left to act as a flexure suspension attaching the proof mass to the frame. This eliminates the need for the polymer deposition step. An example of a constructed FPI sensor using this process is shown in FIG. 7.

Consider now a passband design. The inner multilayer wavelength-dependent reflector surfaces of each sensor were designed to be quarter, half or quarter wave multilayer filters, as described above. The high index of refraction dielectric material ($\mu_H$=3:7) is chosen to be amorphous or $\alpha$ silicon ($\alpha$-Si). The low dielectric index of refraction dielectric material ($\mu_L$=1:4) is chosen to be silicon dioxide (SiO$_2$). These particular materials were chosen because they have the largest difference in index of refraction of materials commonly deposited by PECVD onto silicon substrates. This allows the highest possible reflectance with the minimum number of dielectric layers.

Figure 10:
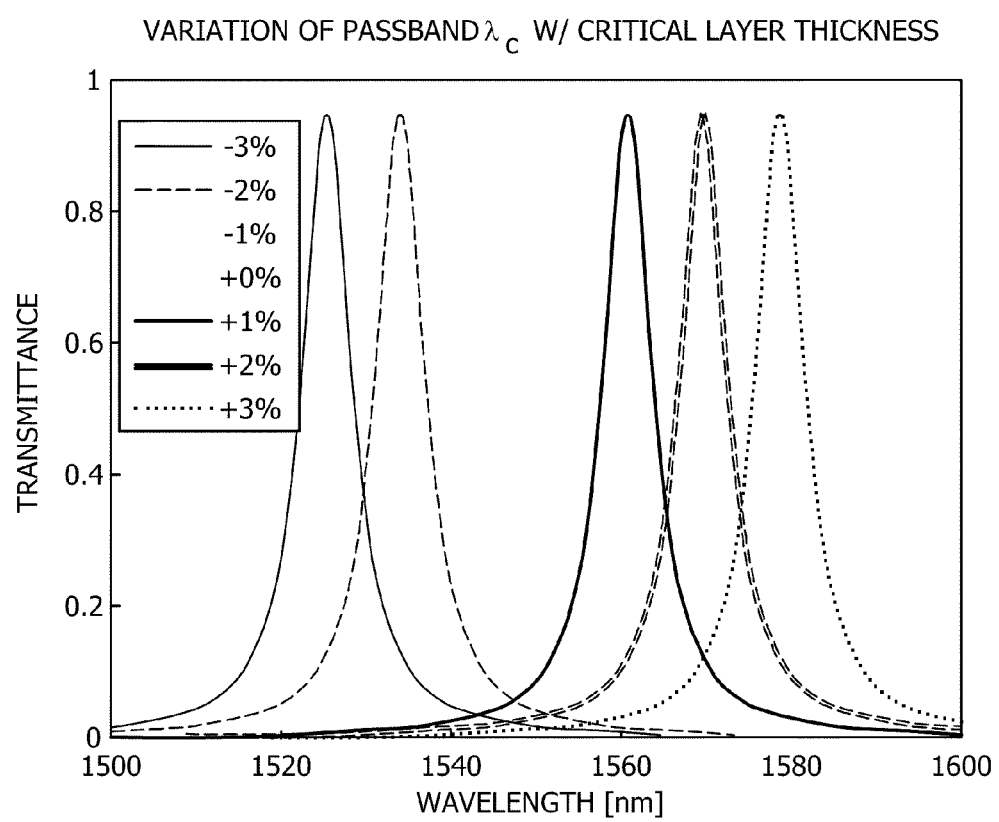
FIG. 10 is a graph of the numerical calculation of passband position with variation in critical, central layer thickness.
Figure 11:
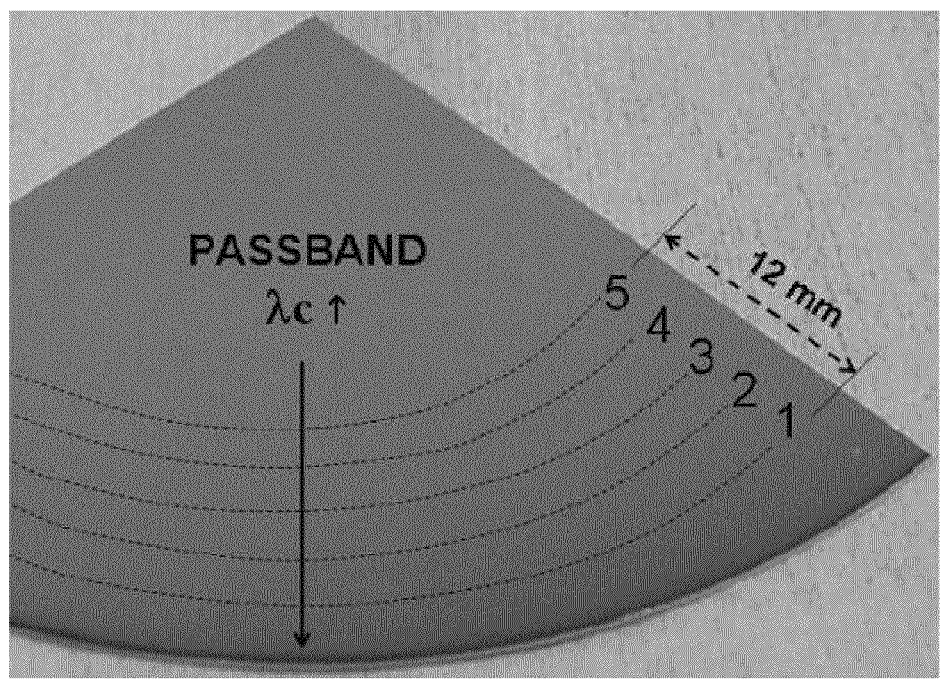
FIG. 11 is a color photograph of the radial orientation of thin film thickness, as indicated by the radial change in surface hue.
Figure 12:
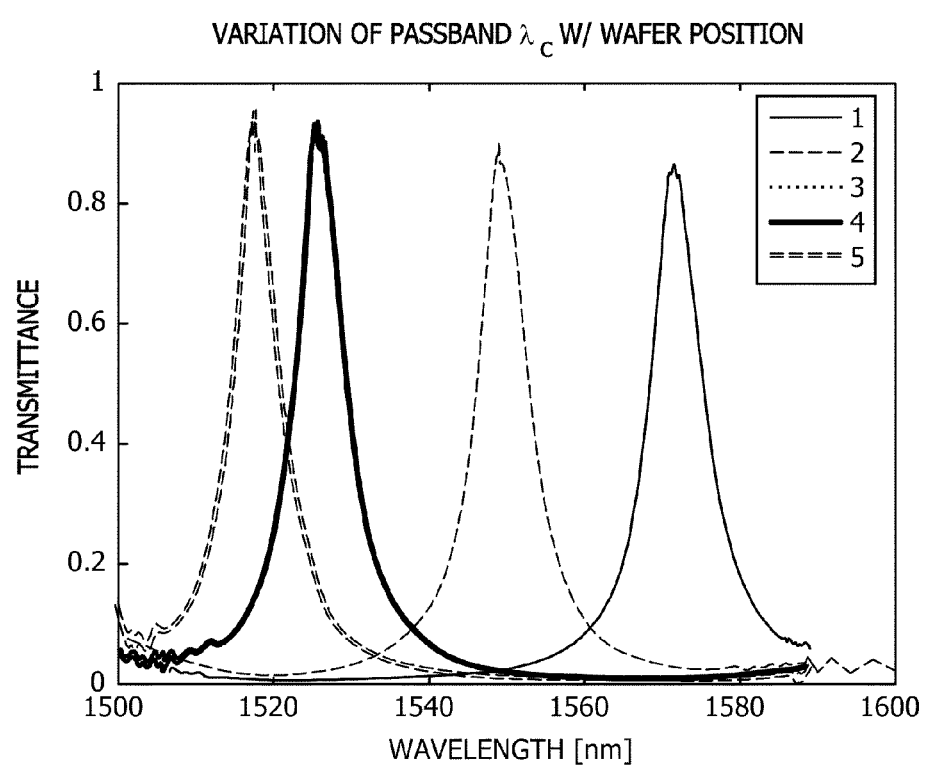
FIG. 12 is a graph of the experimental measurement of passband position with radial change in wafer position at positions of FIG. 11.
Figure 13:
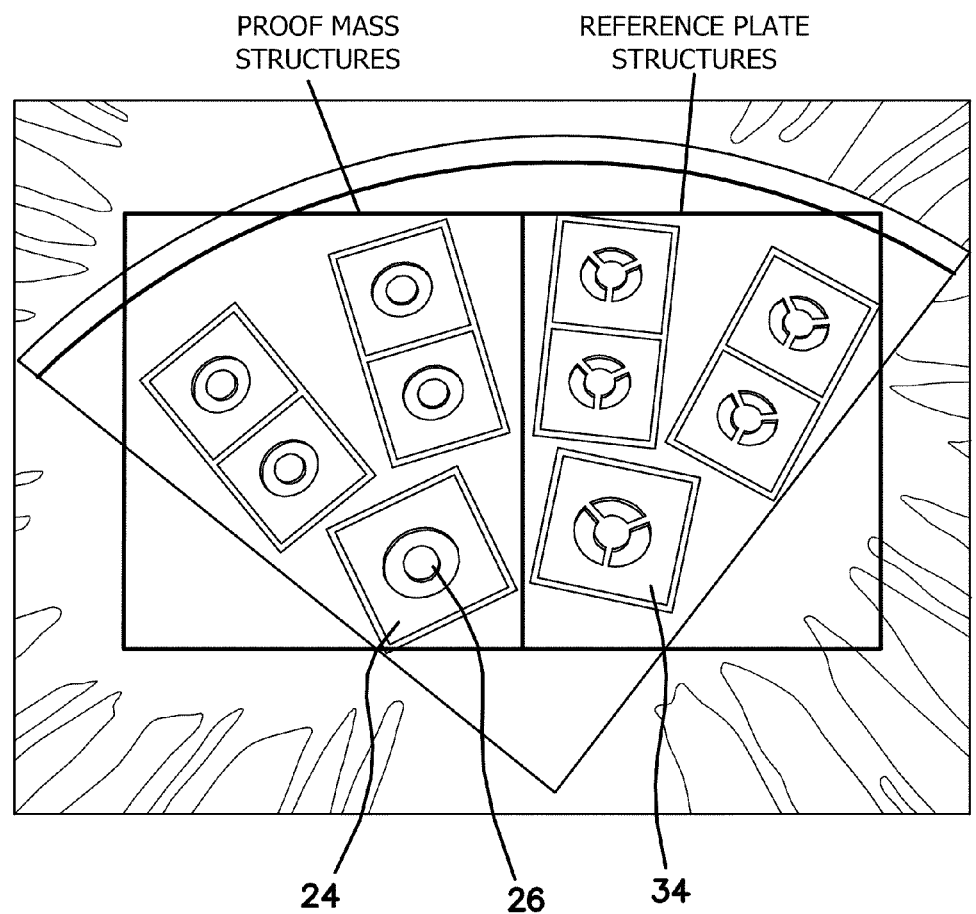
FIG. 13 is photograph of the partially completed wafer at step 4 of the fabrication process shown in FIGS. 5 and 6 showing the radial orientation of wafer component pairs on the substrate wafer.

Ten layers were deposited on a full circular silicon wafer substrate by using alternating PECVD deposition steps. The SiO$_2$ quarter wave layer thicknesses are 264 nm and the $\alpha$-Si quarter wave layer thicknesses are 104 nm. The central half wave layer of $\alpha$-Si is targeted to have a 208 nm thickness. This thin film design is intended to place a passband fringe at the 1550 nm wavelength. The chemical vapor deposition rate of dielectric material is well known to have a strong radial dependence and will vary from the center of the substrate due to limited diffusion of reactants across the surface of the substrate. Most fabrication processes are tuned to minimize this effect in order to create uniform layers across the wafer. Here this dependence is used to form layers with thickness that vary with radial position. This effect is taken advantage of here to allow the sensor components for the serial system to be fabricated from a thin film filter deposited onto a single substrate wafer. The wavelength position ($\lambda_c$) of the passband ($\Delta\lambda_{PB}$) formed by the high transmittance fringe of the thin film filter is very sensitive to variations in the central critical layer thickness ($t_c$), according to FIG. 5. A single percentage change in the thickness of this layer will change the wavelength position of this passband fringe by an amount greater than the passband fringe width, as shown in equation 10. For the specific process parameter used here, a ±3% change in layer thickness and the corresponding passband wavelength position is observed over a 12 mm radial band on the substrate wafer (FIG. 11, as seen in FIGS. 10 and 12). FPI sensor components fabricated from the same radial position on the substrate wafer will have identical wavelength-dependent properties. When FPI sensors are constructed of a proof mass structure component and a reference structure component fabricated from the same radial position on the substrate wafer (see FIG. 13), the passband of each component will be in the same wavelength position. This will form an optical passband through the device. By constructing FPI sensors from component pairs at different radial positions, the optical passbands through each device will be at different wavelengths allowing serialization. In this way, the series can be fabricated in parallel from a single wafer.

Figure 14:
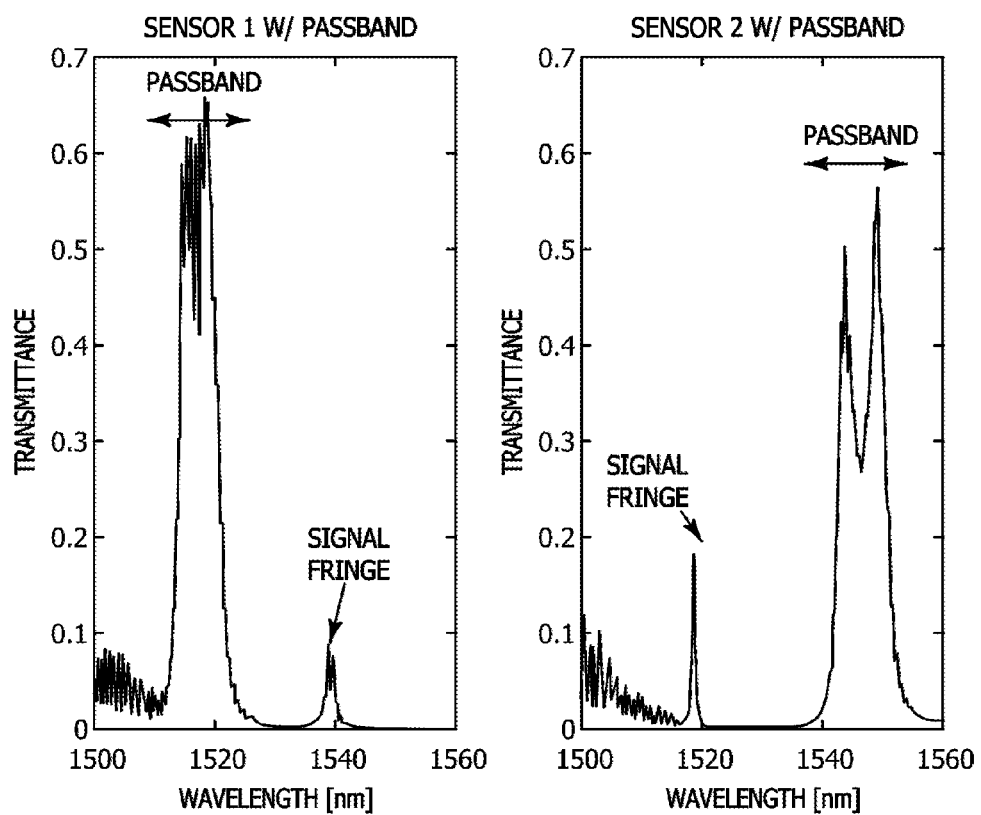
FIG. 14 are two graphs of transmittance as a function of wavelength of two sensors respectively with conjugate passband fringe-signal band fringe properties for serial multiplexing.
Figure 16:
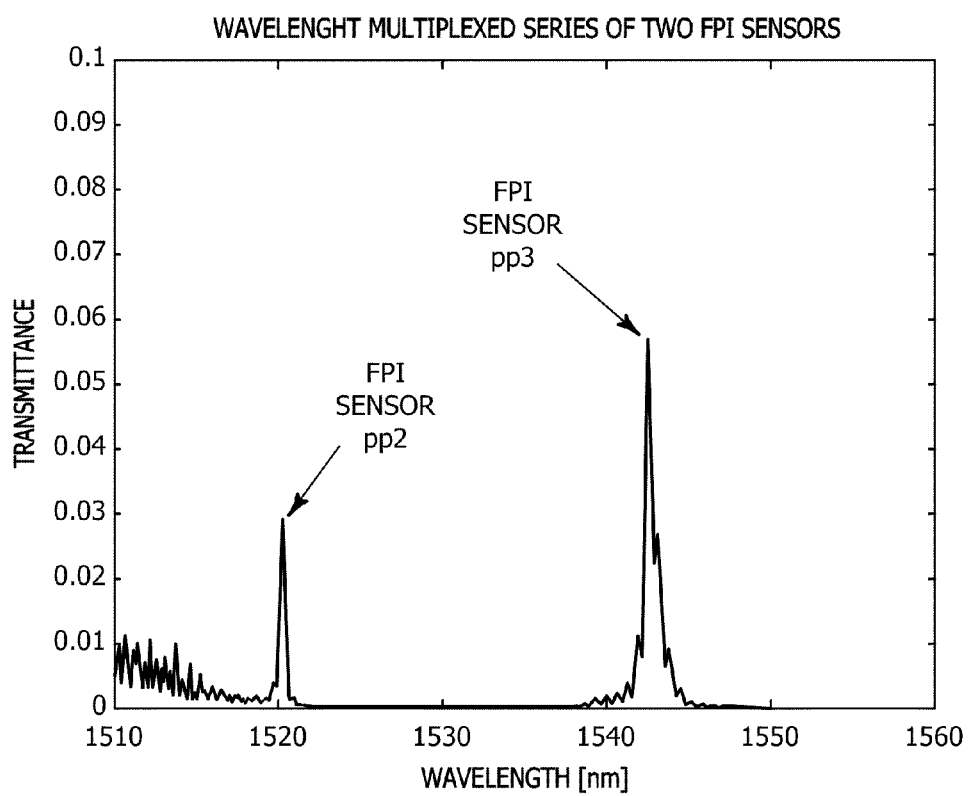
FIG. 16 is a graph of transmittance as a function of wavelength of multiplexed signal fringes from two FPI sensors in a linear serial array.

Consider the signalband design. During the final step of the fabrication process, the proof mass and reference plate structures are aligned relative to each other manually before having the optical cavity gap spacing fixed with a spacer. The wavelength position of interferometric fringe is monitored during the alignment. If the wavelength ($\lambda$) of this fringe is within the high reflectance region of the reflector (the signal band $\Delta\lambda_{SB}$), then the fringe will be sharp (having high interferometric finesse) and be suitable for high resolution sensing. In the current system implementation, all wavelengths outside the low reflectance, high transmittance passband fringe are available for use as the signalband. The spacing (t) is set such that the interferometric fringe created by the optical cavity between the proof mass and the reference plates is at the wavelength in the passbands of the other sensors in the serial array, as defined by equation (2), such as those shown in FIG. 14. For the demonstrated two sensor system, the optical fringe properties are conjugates such that the passband fringe of one sensor is at the wavelength of the signal fringe of the other sensor, and vice-versa. In this demonstration, the observation of both of the signal fringes in the optical output of the serialized system indicates successful wavelength multiplexing of the interferometric signals, such as shown in FIG. 16.

We can now demonstrate the passband operation. In order to operate effectively, the optical passband of each Fabry-Perot sensor must have two characteristics. It has to:

Be of high optical transmittance (approaching unitary) such that passed signals are not attenuated significantly.

Have optical transmittance invariant to changes in the measurand (i.e. acceleration) such that passed signal are not changed (modulated) causing cross-talk between sensors.

The wavelength position of the passband fringe is only on the thickness of the central critical thin film. Accordingly, displacement between the proof mass and reference plate due to acceleration does not change the position of the passband. As previously mentioned, the high transmittance of the passband fringe is accomplished by using thin film materials with large differences in optical index of refraction.

Figure 15:
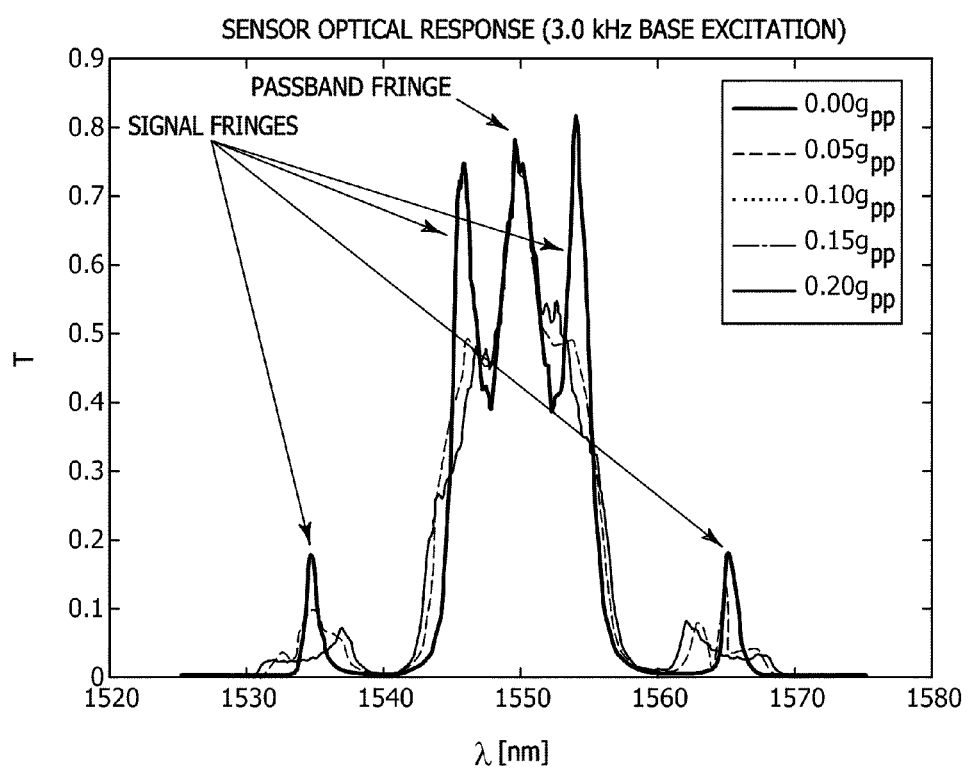
FIG. 15 is a graph of sensor optical response as a function of wavelength of an individual FPI acceleration sensor with multiple signal fringes under constant peak-to-peak sinusoidal acceleration (gpp) excitation showing passband invariance.

FIG. 15 shows a static optical characterization of a sample of the developed accelerometer with a fringe passband under acceleration excitation. Multiple signal fringes are shown in the optical output, along with the passband fringe. The displacement of the signal fringes relative to wavelength under excitation is shown in the distorted static optical response. This represents the time-averaged response of the dynamic optical response. In the ideal case, each interferometric sensor is of a low enough order (n) that only one signal fringe is present in the transmitted spectrum of each device for the wavelength range over which the series will be used. This is in order to minimize the chance for interference between the signal fringe and the passband fringe causing distortion of the signal fringe and introducing cross-talk between the sensors. In the case observed here in which multiple fringes are observed, the passband fringe remains undistorted. This indicates that negligible cross-talk from the passband sensor will be introduced onto the passed signal fringes from other sensors in the series.

Figure 17:
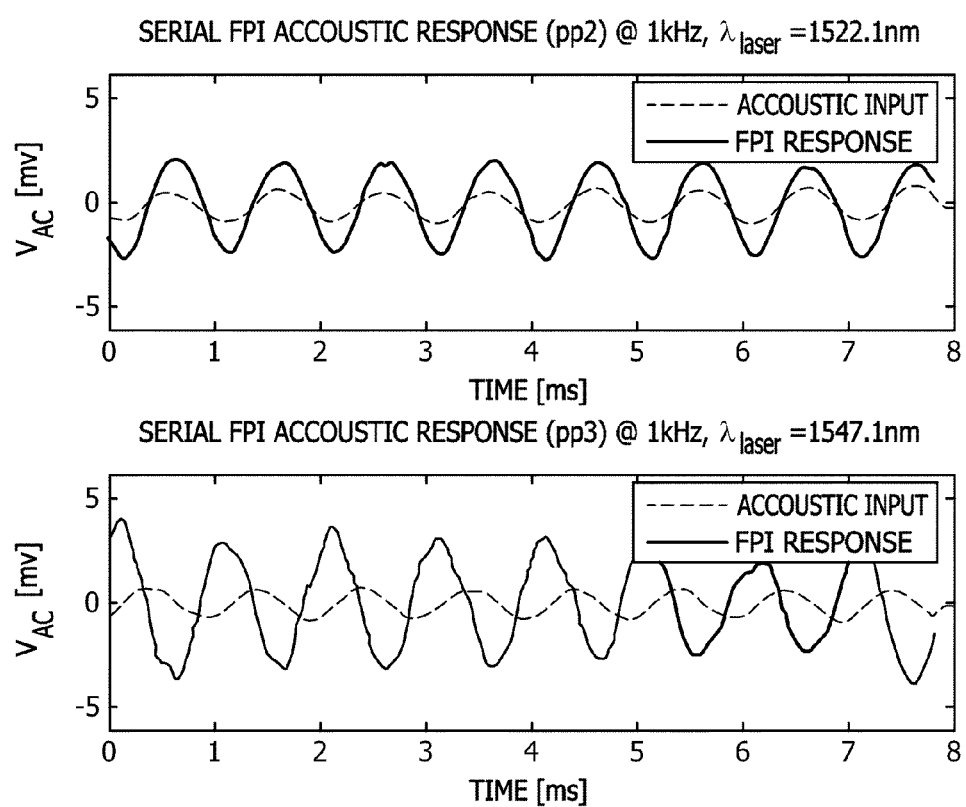
FIG. 17 are graphs of the demultiplexed displacement response signals from each of the two sense fringes shown in FIG. 16 under acoustic excitation.

We further demonstrate multiplexed sensing. The operation of single FPI sensors fabricated as above has been previously demonstrated by the present inventors. See M. A. Perez, E. J. Eklund, and A. M. Shkel. Designing micromachined accelerometers with interferometric detection. *IEEE Sensors* 2005 *Conference Proceedings*, September 2005. Using similar techniques, a system of two serialized devices is demonstrated. The demonstration is achieved by directing a tunable laser (HP 8168E) through two appropriate devices with wavelength shifted transmittance characteristics in series and monitoring the transmitted power via an amplified photodetector (Thorlabs PDA255). The laser output power is fixed (1000 $\mu$W) at the half-power wavelength of each devices fringe. Both samples are simultaneously excited acoustically via a voice coil in a sinusoidal fashion. As the interference fringe moves from its rest position under the load, the transmitted optical power is attenuated according to the sample's optical and mechanical characteristics according to equation (10). The wavelength of the laser is switched between the half-power point of the two devices to eliminate the need for demultiplexing the wavelength signals after transmission but the orientation of the devices is not adjusted. The acoustic input power is monitored by a small condenser microphone (Radio Shack 33,3013) is manifested as a voltage. The response of each device as a optical power modulation is also monitored as a voltage from the photodetector. For the serialized system with the serial multiplexed fringe characteristic of FIG. 16, FIG. 17 demonstrates the response of each sensor to the same acoustic excitation. It is observed that the response of each sensor follows the acoustic signal indicating that the wavelength multiplexed signal from each sensor in the series is responding to the excitation.

Thus, it can be understood that the illustrated embodiments are directed to, a. Fabry-Perot Interferometer-based sensors constructed in which the wavelength signals from each simply serially connected sensor element is multiplexed (combined) with the other signals as intensity peaks in the transmitted light wavelengths.

b. Optical signal multiplexing capability is built into the properties of each sensor by producing sensors with wavelength-dependent reflectance characteristics.

c. Multiplexing by optical signal is achieved by placing the sensors in a simply connected linear array along a beam of light.

d. A method for constructing the components of the sensor elements of the system from a parallel fabrication process using a single substrate wafer and the deposition of thin films.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. An apparatus comprising:
   a plurality of Fabry-Perot interferometric sensors optically coupled in series with each other to form an ordered optical series, each Fabry-Perot interferometric sensor having a unique signalband and a passband, each Fabry-Perot interferometric sensor having its unique signalband within the passbands of all of the next higher ordered Fabry-Perot interferometric sensors in the optical series so that a corresponding unique fringe signal from each of the Fabry-Perot interferometric sensors is a multiplexed output from the optical series; and
   wherein each Fabry-Perot interferometric sensor comprises an accelerometer having a reference plate and a proof mass plate coupled to the reference plate and movable with respect thereto, the reference plate and proof mass plate having optically treated surfaces to form an optical resonance cavity between each other, the optical resonance cavities of the plurality of accelerometers being serially optically coupled with each other to form the ordered optical series.

2. The apparatus of claim 1 where each Fabry-Perot interferometric sensor is characterized by wavelength-dependent reflectance.

3. The apparatus of claim 1 where the plurality of Fabry-Perot interferometric sensors are optically coupled with each other to form a simply connected linear array along a beam of light.

4. The apparatus of claim 1 where each Fabry-Perot interferometric sensor comprises a thin film multilayer reflector.

5. The apparatus of claim 4 where the thin film multilayer reflector comprises a quarter wave multilayer reflector.

6. The apparatus of claim 5 further comprising two quarter wave reflectors with an intervening half wave dielectric layer therebetween.

7. The apparatus of claim 1 where each Fabry-Perot interferometric sensor comprises a Rugate thin film reflector.

8. The apparatus of claim 1 further comprising a broadband light input optically coupled to a first one of the Fabry-Perot interferometric sensors of the ordered optical series and an optical detector optically coupled to the a last one of the Fabry-Perot interferometric sensors of the ordered optical series.

9. The apparatus of claim 1 where each of the Fabry-Perot interferometric sensors is a seismic accelerometer with integrated optical signal wavelength multiplexing capability.

10. A method of using the plurality of Fabry-Perot interferometric sensors of claim 1 for acceleration sensing at multiple points over a distributed area, including, but not limited to large system or vehicle monitoring, structural health monitoring, tactical or border monitoring.

11. An apparatus comprising: a plurality seismic accelerometers, each seismic accelerometer having a reference plate and a proof mass plate coupled to the reference plate and movable with respect thereto, the reference plate and proof mass plate having optically treated surfaces to form an optical resonance cavity between each other forming a corresponding Fabry-Perot interferometric sensor, the optical resonance cavities of the plurality of accelerometers being serially optically coupled with each other to form an ordered optical series, each Fabry-Perot interferometric sensor having a unique signalband and a passband, each Fabry-Perot interferometric sensor having its unique signalband within the passbands of all of the next higher ordered Fabry-Perot interferometric sensors in the optical series so that a corresponding unique fringe signal from each of the Fabry-Perot interferometric sensors is a multiplexed output from the optical series.

* * * * *